(12) United States Patent
Blomgren

(10) Patent No.: US 6,397,940 B1
(45) Date of Patent: Jun. 4, 2002

(54) METHOD OF JOINING AT LEAST FOUR HEAT TRANSFER PLATES TO A PLATE PACKAGE, AND A PLATE PACKAGE

(75) Inventor: Ralf Blomgren, Skanör (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 09/719,713

(22) PCT Filed: Jun. 24, 1999

(86) PCT No.: PCT/SE99/01149

§ 371 (c)(1),
(2), (4) Date: Dec. 15, 2000

(87) PCT Pub. No.: WO99/67041

PCT Pub. Date: Dec. 29, 1999

(30) Foreign Application Priority Data

Jun. 24, 1998 (SE) .............................................. 9802244

(51) Int. Cl.[7] .............................. F28F 9/00; B21D 53/04
(52) U.S. Cl. ................... 165/167; 165/166; 29/890.054; 219/121.64
(58) Field of Search ................................ 165/166, 167; 219/121.63, 121.64; 29/890.03, 890.054

(56) References Cited

U.S. PATENT DOCUMENTS

| | | | | |
|---|---|---|---|---|
| 4,644,129 A | * | 2/1987 | Miller | 219/121 LC |
| 4,688,631 A | | 8/1987 | Peze et al. | 165/166 |
| 4,760,236 A | * | 7/1988 | Stoll | 219/121.63 |

FOREIGN PATENT DOCUMENTS

| | | | |
|---|---|---|---|
| DE | 4000420 | 7/1990 | |
| EP | 0578933 | 1/1994 | |
| GB | 580368 | 6/1944 | |
| JP | 57-124589 A1 * | 8/1982 | ........... B23K/31/06 |
| JP | 3-248787 A1 * | 11/1991 | ........... B23K/26/00 |
| JP | 4-270084 A1 * | 9/1992 | ........... B23K/26/00 |
| JP | 7-214319 | 8/1995 | |
| JP | 10-164802 A1 * | 6/1998 | |
| WO | WO93/13377 | 7/1993 | |
| WO | WO93/15369 | 8/1993 | |

OTHER PUBLICATIONS

PCT International-Type Search Report—from SE priority application.
PCT International Search Report—from PCT/SE99/01149.

* cited by examiner

*Primary Examiner*—Allen Flanigan
(74) *Attorney, Agent, or Firm*—Fish & Richardson P.C.

(57) ABSTRACT

The application discloses a method of joining at least four heat transfer plates (2) to a plate package for a plate heat exchanger. Each heat transfer plate (2) comprises an outer edge portion (10) extending around the heat transfer plate in its edge area and an inner edge portion (11) extending around the heat transfer plate inside the outer edge portion (10). The heat transfer plates (2) are joined in pairs at a first contact plane to at least two plate pairs (16) along said inner edge portions (11). An outer edge portion of one of said plate pairs is brought to abutment at a second contact plane (20) to an outer edge portion of another of said plate pairs. The outer edge portions (10) are welded. The application also discloses a plate package produced in this manner.

16 Claims, 5 Drawing Sheets

METHOD OF JOINING AT LEAST FOUR HEAT TRANSFER PLATES TO A PLATE PACKAGE, AND A PLATE PACKAGE

THE BACKGROUND OF THE INVENTION AND PRIOR ART

The present refers to a method of joining at least four heat transfer plates to a plate package for a plate heat exchanger, wherein each heat transfer plate comprises an outer edge portion extending around the heat transfer plate in its edge area and an inner edge portion extending around the heat transfer plate inside the outer edge portion, and wherein the method includes the steps of: joining the heat transfer plates in pairs at a first contact plane to at least two plate pairs along said inner edge portions, bringing an outer edge portion of one of said plate pairs to abutment at a second contact plane to an outer edge portion of another of said plate pairs, and welding said two outer edge portions to each other by means of a weld joint.

The invention also refers to a plate package of joined heat transfer plates for a plate heat exchanger, in which each heat transfer plate comprises an outer edge portion extending around the heat transfer plate in its edge area and an inner edge portion extending around the heat transfer plate inside the outer edge portion, wherein the heat transfer plates are joined in pairs to at least two plate pairs along said inner edge portions at a first contact plane and wherein one of said plate pairs is welded at a second contact plane to an adjacent of said plate pairs along said outer edge portion by means of a weld joint.

Each heat transfer plate in such a plate package is usually provided with four through-going holes, so-called port-holes. The heat transfer plates abut each other in such a manner that the port-holes form four port channels through the plate package and that two sets of heat transfer passages are formed between the heat transfer plates. Each heat transfer passage is connected to two of the port channels.

Such plate packages are comprised by a plate heat exchanger through which two heat exchanging fluids are intended to flow; one through each of the two sets of heat transfer passages and associated port channels.

It is essential for the function of such a plate heat exchanger that the plate package is sealed in such a manner that no heat exchanging fluids may leak out of the plate heat exchanger in which the plate package is contained. When the plate package is joined in the manner initially defined, satisfactory possibilities are offered to check the tightness of the plate package. The tightness may be checked in each plate pair prior to being joined by means of said weld joint. When the plate pairs have been welded to each other the tightness of the whole plate package may be tested. If then any untight weld joint appear it is accessible for correction from the outside of the plate package.

EP 578 933 and GB 580 368 disclose a plate heat exchanger comprising heat transfer plates which firstly have been joined by welding and thereafter to plate packages.

The plate heat exchanger disclosed in EP 578 933 comprises heat transfer plates which firstly are welded in pairs to cassettes about two of the four port-holes of the heat transfer plates and along edge portions of the heat transfer plates. Thereafter, the cassettes are brought to abutment to each other and the heat transfer plates are welded about the two other port-holes and along outer edge portions of the heat transfer plates. The latter weld joints in the outer edge portions are shaped as edge welds.

GB 580 368 discloses a plate heat exchanger which comprises heat transfer plates permanently joined by resistance welding. The heat transfer plates are firstly welded to each other in pairs to plate pairs along inner edge portions and thereafter the plate pairs are welded to each other along outer edge portions.

JP 7-214 319 discloses a method of welding heat transfer plates which are provided with port-holes by means of edge welds. The heat transfer plates are welded to each other along edges of the port-holes by means of a TIG-weld. The heat transfer plates are held during the welding in pairs about the port-holes by means of a special device which also leads heat from the welded area in order to avoid heat deformations.

Modern weld methods with a high energy beam, such as electron beam welding or laser welding, have many advantages from a productions point of view. Such methods are for instance well suited for automatic manufacturing and result in weld joints having a high and uniform quality. In connection with welding of heat transfer plates to a plate package, the greatest advantage of such modern weld methods is the low power generation merely subjecting the heat transfer plates to insignificant heat deformations. WO93/15369 describes a plate heat exchanger comprising a plate package of heat transfer plates which have been welded together by laser welding. One heat transfer plate at the time is welded to the plate package to be formed in such a manner that every second heat transfer plate is welded along inner edge portions and every second heat transfer plate is welded along outer edge portions. The outer edge portions are located between the inner edge portions and the edges of the heat transfer plates. In addition, each heat transfer plate comprises a strengthening bending outside the outer edge portion. However, this known method has the disadvantage that a satisfactory check of the tightness is difficult to obtain. Practically, it is too inefficient to perform a tightness check after the welding of each heat transfer plate. Instead, a tightness check is made when the whole plate package or an essential part thereof, for instance 10–30 heat transfer plates, has been welded together. If a weld joint between the inner edge portions thereby is not completely tight, this weld joint is practically not any longer repairable and the whole plate package or the module has to be thrown away. Consequently, this method of manufacture requires a high process security in the production if one is to obtain an acceptable level of rejection. In order to obtain such a process security, extensive testing and adjustment of the different process parameters are required for each material quality. Consequently, this weld method is expensive for the manufacturing of plate heat exchangers in small series or in less usual materials.

However, welding by means of a high energy beam is by the technique available today not possible to utilise for the method initially defined since a heat transfer plate of a plate pair, which is not to be welded to a heat transfer plate in an adjacent plate pair, shades the heat transfer plates to be welded together. A nozzle for a high energy beam and a shielding gas surrounding the beam are in addition too large to be housed between two heat transfer plates in a plate pair. Thereby, it has been proposed to form the weld joint as an edge weld. However, it is very difficult to focus a high energy beam on the edge end surfaces of the heat transfer plates if, for instance, the joint is not precisely straight or if there is a small gap between the plates in the joint.

SUMMARY OF THE INVENTION

The object of the present invention is to remedy the problems mentioned above and provide an improved weld joint between plate pairs to be welded together to a plate package for a plate heat exchanger.

This object is obtained by the method initially defined, which is characterised in that said weld joint is produced by means of a high energy beam directed towards one of said outer edge portions at a distance from the outer edge thereof and at an angle other than. perpendicular with respect to said contact plane. Such a concentrated high energy beam, for instance a laser beam or an electron beam, may focus in a vary accurate manner on one of the edge portions of the plate pairs, which means that the weld joint formed will extend through both of the adjacent edge portions and ensure a connection of high reliability and quality. In addition, the checking possibilities offered by the method initially defined may be utilised completely. It has been found that a high energy beam may penetrate both the outer adjacent edge portions and produce a weld joint extending through these portions even if the high energy beam does not hit the surface of the edge portion by a right angle. In such a manner, one may in a simple and elegant way utilise a nozzle defined above for a high energy beam regardless of its dimensions. Thereby, the high energy beam may be directed by means of a member and at least one of the member and the heat transfer plates is moved in relation to each other in such a manner that the member is guided along the outer edge portion beside the heat transfer plates.

According to an embodiment of the invention, essentially each heat transfer plate is provided with four port-holes, wherein two of the port-holes are surrounded by first portions and the two other port-holes are surrounded by second port portions, the heat transfer plates in said plate pairs being joined along the first port portions before the plate pairs are welded to each other. According to an advantageous embodiment of the invention, said plate pairs may then be welded to each other along the second port portions by means of a high energy beam directed towards one of said second port portions at an angle other than perpendicular with respect to said contact plane. In such a manner a weld joint of a high reliability and quality is obtained also in this case. Thereby, said high energy beam may be directed by means of a member guided around the second port portion.

According to a further embodiment of the invention, at least four plate pairs are stacked onto each other to a plate package and welded to each other in an order differing from the order by which the plate pairs are stacked in the plate package. In such a manner, at least initially abutting plate pairs will not be welded immediately after each other but from a first plate pair said member will be moved to a second plate pair, wherein a number of plate pairs are located between the first and the second plate pairs. By such a method, one may avoid deformations of the final plate package due to the thermal tensions arising during the welding.

According to a further embodiment of the invention, said high energy beam is a laser beam. The object is also obtained by the plate package initially defined, which is characterised in that said weld joint is produced by means of a high energy beam and has, seen in a cross section through said outer edge portions, a central line forming an angle other than perpendicular to the second contact plane. Such a weld joint has a high quality and ensures a high reliability with respect to the tightness of the plate package.

Advantageous embodiments of the plate package are defined in the dependent claims 11 to 14. Said angle may advantageously be between 50° and 70°, preferably about 60°.

BRIEF DESCRIPTION OF THE DRAWINGS

The present invention is now to be explained more closely by means of one embodiment described by way of example and with reference to the drawings attached, in which FIG. 1 discloses a plate heat exchanger having a plate package according to the present invention, FIG. 2 discloses a plane view of a heat transfer plate of the plate package, FIG. 3 discloses a cross-sectional view of a plate pair of the plate package, FIG. 4 discloses a cross-sectional view of two such plate pairs being welded according to the invention, FIG. 5 disclose in a cross-sectional view how the heat transfer plates are welded by means of a laser tool, and FIG. 6 discloses in a view from above how the heat transfer plates are welded by means of a laser tool.

DETAILED DESCRIPTION OF AN EMBODIMENT OF THE INVENTION

Figure 1:
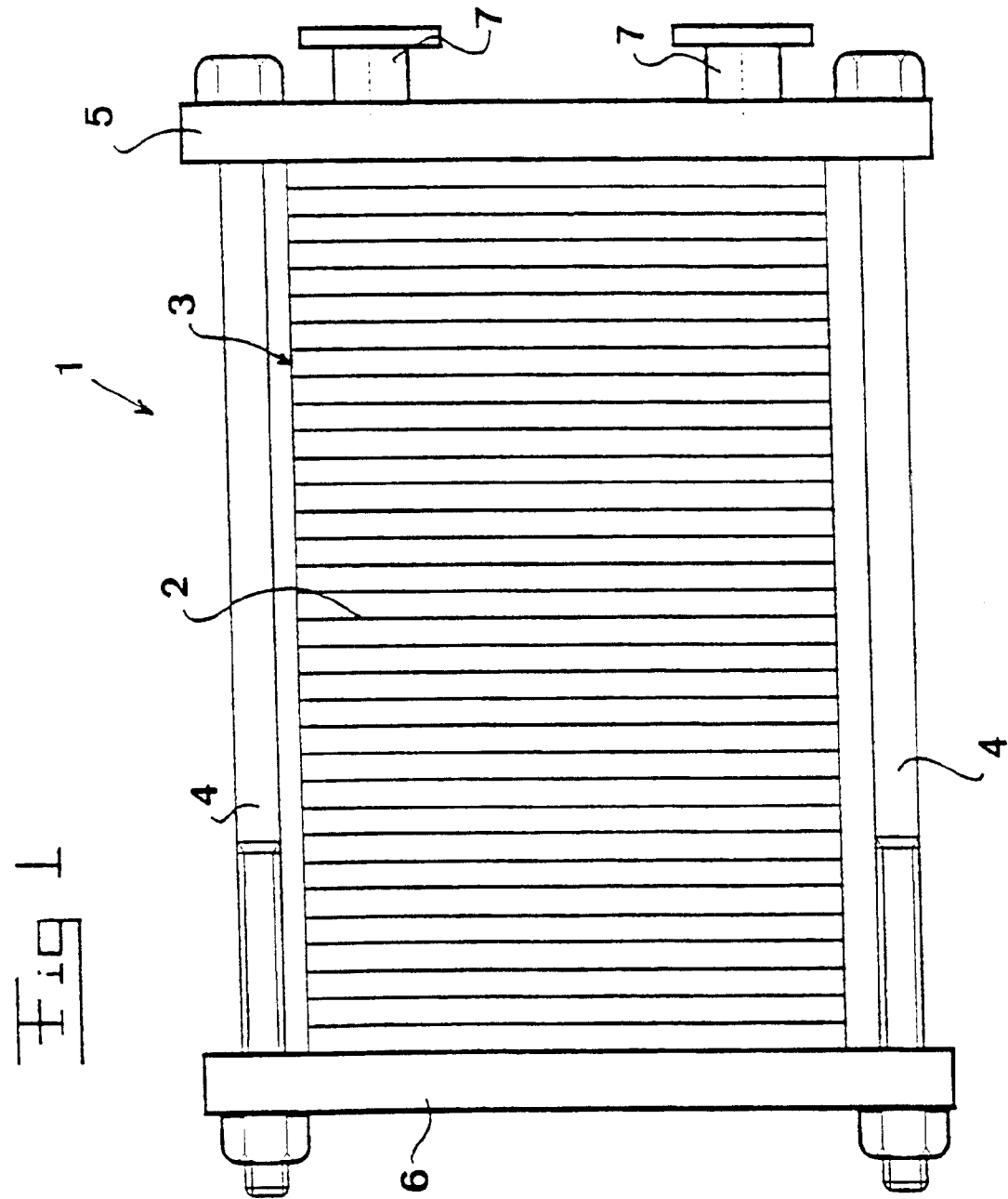

FIG. 1 discloses a type of plate heat exchanger 1 comprising heat transfer plates 2 which are joined to a plate package 3 by welding by means of the method according to the present invention. The plate package 3 is tightened between two support plates 5 and 6 by means of tie bolts 4. One of the support plates 5 is provided with four connecting pipes 7, only two of which are disclosed in FIG. 1. Via the connection pipes 7, two heat transferring fluids are intended to flow through the plate heat exchanger 1 in a manner known per se.

Figure 2:
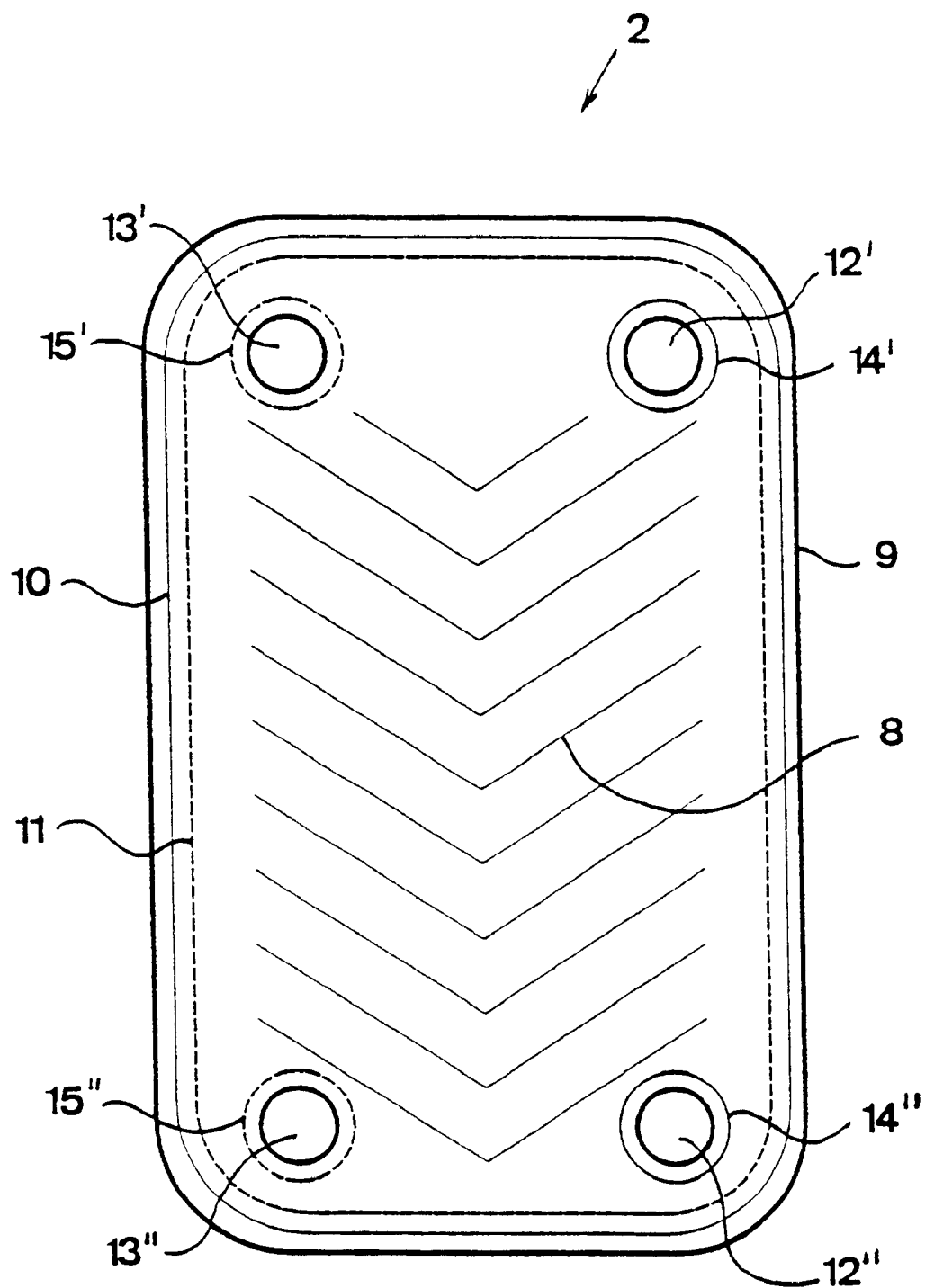

A heat transfer plate 2, contained in the plate package 3, is disclosed in FIG. 2. The heat transfer plate 2 has been pressed to have protrusions and depressions, partly for forming a press pattern 8 on the central parts of the heat transfer plate 2 over which the heat transferring fluids are intended to flow and partly for forming contact surfaces along which the heat transfer plate 2 is joined to adjacent heat transfer plates 2 in the plate package 3. Along the outer edge 9 of the heat transfer plate 2, a first outer edge portion 10 extends, which in FIG. 2 is illustrated as a continuous line even if the outer edge portion 10 has a certain width. Inside the outer edge portion 10, a second inner edge portion 11 extends, which in FIG. 2 is illustrated by a dotted line and which also may have a certain width. The edge portions 10, 11 are located at different levels, see FIGS. 3 and 4. Furthermore, the heat transfer plate 2 is provided with four port-holes 12', 12", 13', 13", which are surrounded by essentially plane port portions 14', 14", 15', 15", which also are illustrated as dotted and continuous lines, respectively, and extend around a respective port-hole. The port portions 14' and 14" are located at the same level as the inner edge portion 11 and the port portions 15' and 15" are located at the same level as the outer edge portion 10, see FIGS. 3 and 4.

Figure 3:
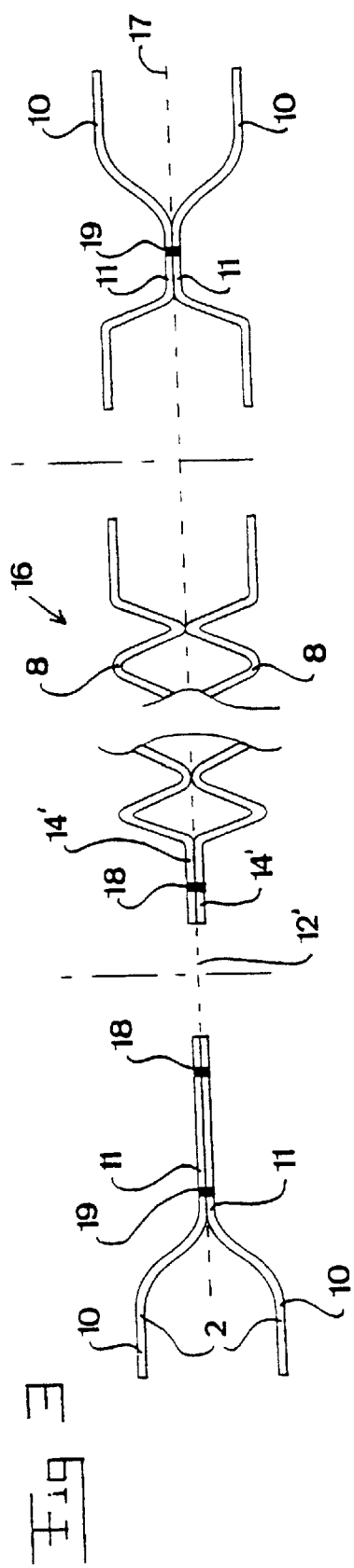

When a plate package 3 is to be manufactured by heat transfer plates 2, the heat transfer plates 2 are firstly joined together two and two to plate pairs 16, see FIG. 3. This joining is performed, according to the embodiment disclosed, by means of laser welding. However, it is to be noted that for this joining also other joining methods may be utilised, preferably any one which makes use of a high energy beam, for instance electron beam welding. It is also possible to utilise for instance resistant welding. During this welding of the heat transfer plates 2 to plate pairs 16, the heat transfer plates 2 are turned to be brought to abutment to each other at a first contact plane 17 along the inner edge portions 11 and along two of the port portions 14' and 14" about the port holes 12' and 12". The heat transfer plates 2 are welded together in the port portions 14' and 14" by means of weld joints 18 and along the inner edge portions 11 by means of weld joints 19. After the plate pair 16 has been welded, the weld joints 18 and 19 are checked with respect to the tightness. If any plate pair 16 is not completely tight, the weld joint 18, 19 in question may thereby be welded once again in a simple manner.

Figure 4:
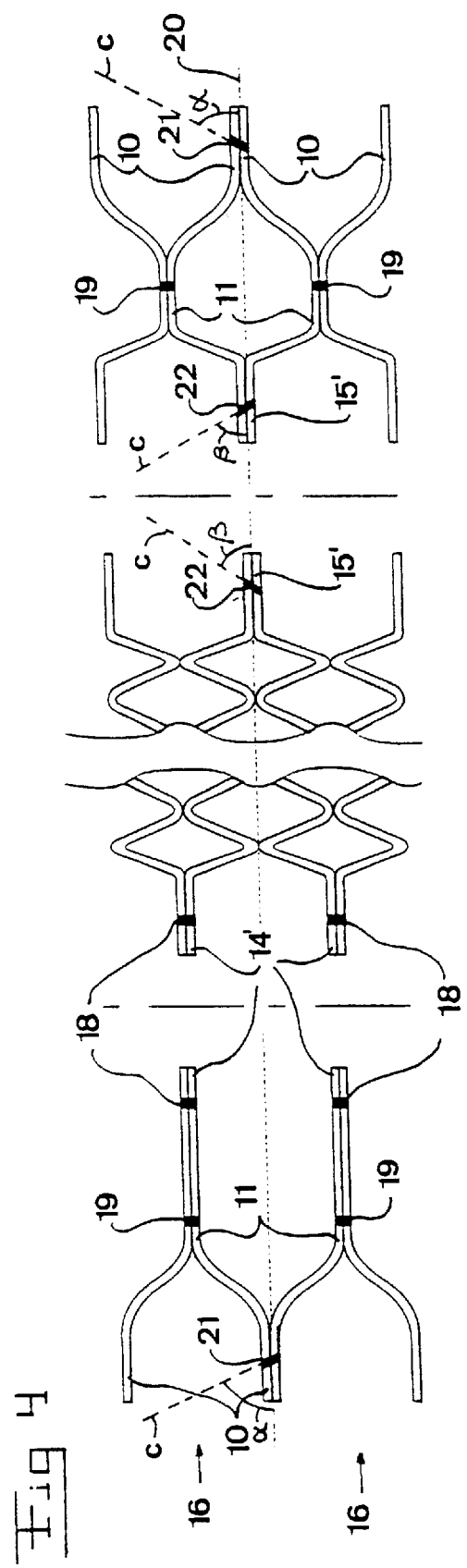

FIG. 4 discloses a section through four heat transfer plates 2, i.e. two plate pairs 16 of the plate package 3. Two adjacent heat transfer plates 2, one from a respective plate pair 16, are brought to abutment to each other at a second contact plane 20 along the outer edge portions 10 of the heat transfer plates 2 and joined by means of a weld joint 21. Said two adjacent heat transfer plates 2 also abut each other at the second contact plane 20 along port portions 15' and 15". These port portions 15', 15" have ben joined by means of a weld joint 22.

As appears from FIG. 4, the weld joints 21 and 22 are inclined in a cross-section in relation to the contact planes 17 and 20. A centre line c extends through each of the weld joints 21, 22 in such a manner that the distance between the centre line c and the outer edge of the melted zone of the respective weld joint 21, 22 is equal at each side of the centre line c. In particular, each centre line c forms an angle α and β, respectively, other than perpendicular to the contact planes 17, 20. According to the present invention, the weld joints 21 and 22 are produced by means of a concentrated high energy beam, for instance a laser beam or an electron beam, which has been directed obliquely towards the outer edge portions 11 and port portions 15' and 15", respectively, of the heat transfer plate 2 in order to avoid shading edges of an adjacent heat transfer plate 2 in the same plate pair 16. Said angle a is between 50° and 70°, preferably about 60°. It is to be noted that also other values of said angle α, β are possible, however it is essential that the angle is such that the edges of an adjacent heat transfer plate 2 do not shade the outer edge portions 10 and port portions 15', 15", respectively, without the high energy being able to focus on the surface of these portions.

Figure 5:
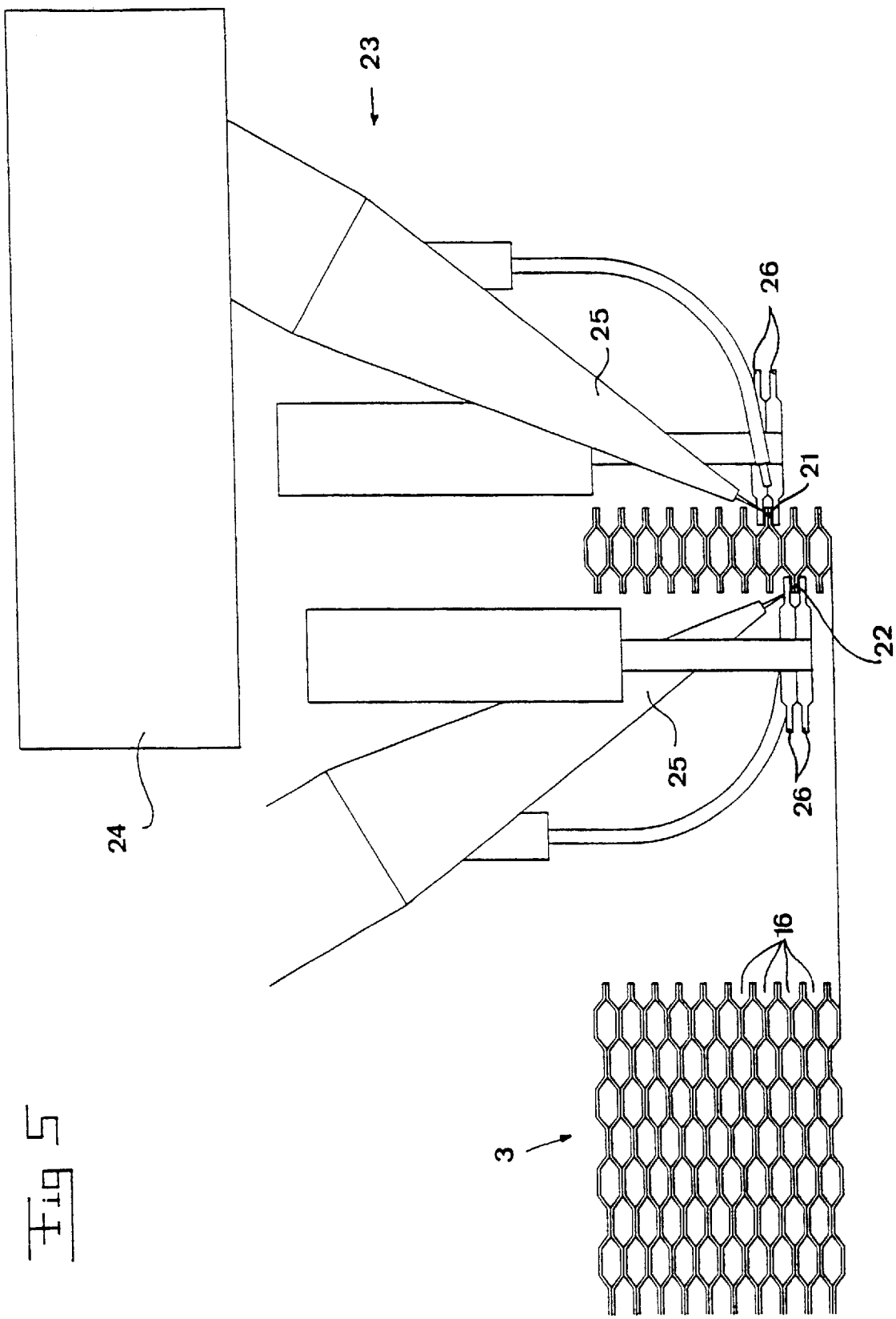
Figure 6:
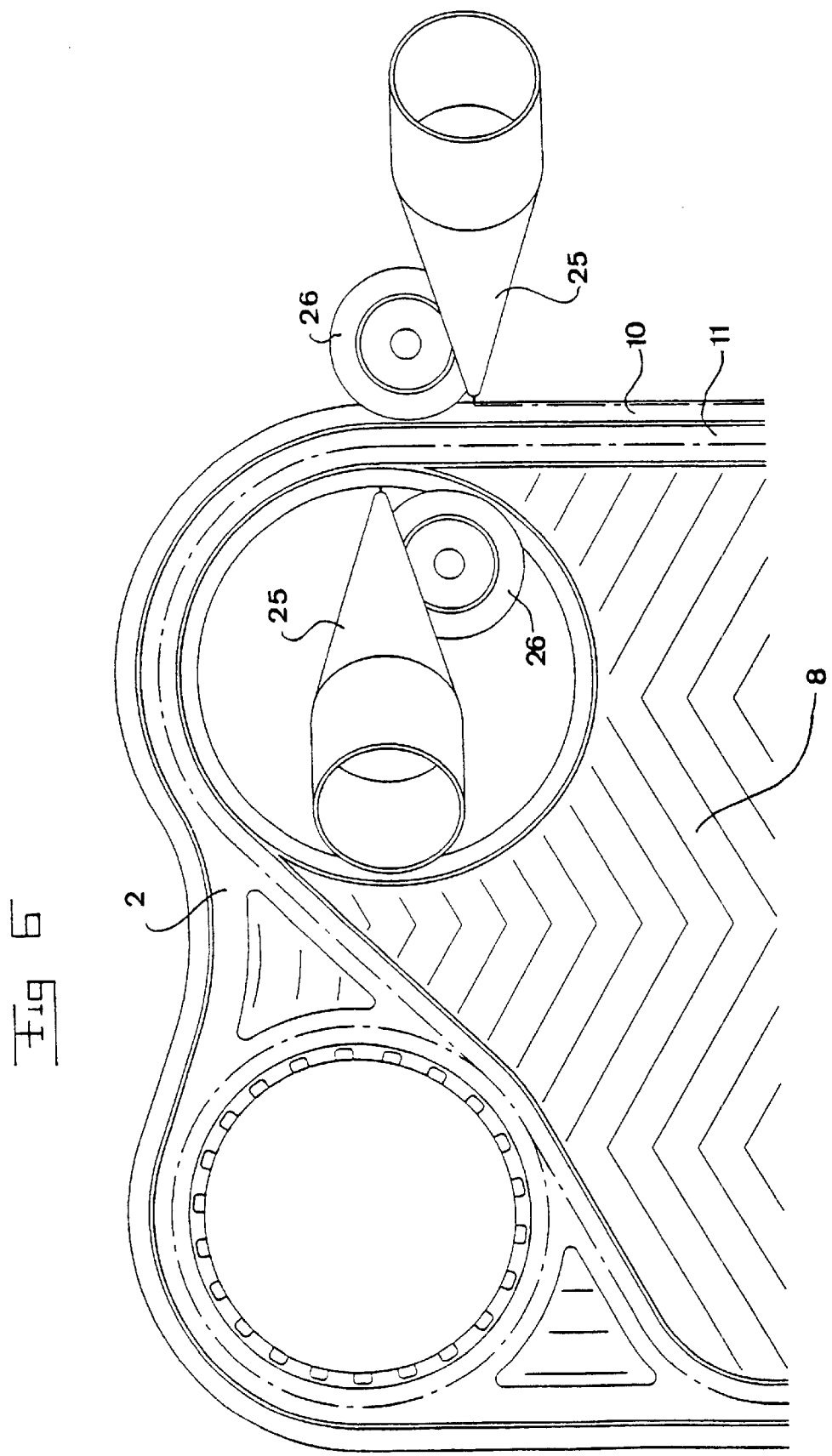

When a plate package 3, comprising two or more plate pairs 16, has been welded together along the weld joints 21 and 22, the tightness of the whole package 3 may be checked. If the plate package 3 is not tight, any of the weld joints 21 and 22 is leaking since the weld joints 18, 19 previously were found to be tight when the individual plate pairs 16 were checked. Consequently, if the plate package 3 is not completely tight, the weld joints 21, 22 in question may thereby be welded once again in a simple manner. The plate package 3 may then be mounted between the two support plates 5 and 6 in the plate heat exchanger 1. FIG. 5 and 6 discloses schematically how the weld joints 21 and 22 may be produced by means of a laser weld tool 23. The laser weld tool 23 comprises a laser 24 schematically disclosed and nozzle 25. The nozzle 25 is arranged to direct a shielding gas and the laser beam at a sloping angle α, β towards the outer edge portions 10 and towards the port portions 15', 15" respectively. Furthermore, the laser tool 23 comprises two press wheels 26 which are arranged to engage between each other to adjacent outer edge portions 10 and to adjacent port portions 15', 15", respectively, in order to position and compress these. In FIGS. 5 and 6, laser tools both for welding of the outer edge portions 10 and for welding of the port portions 15', 15" are disclosed. However, it is to be noted that practically it may be difficult to perform these welding operations simultaneously. In order to avoid thermal deformations of the plate package, the plate pairs 16, in addition, are to be welded together in another order than the order in which the plate pairs 16 are stacked onto each other in the plate. package 3 disclosed. For instance, the tool 23 and/or the plate package 3 are moved in such a manner that the tool 23 is moved firstly along the two lowermost plate pair 16 and directly thereafter along the two uppermost plate pair 16.

The present invention is not limited to the embodiment disclosed but may be varied and modified within the scope of the following claims.

What is claimed is:

1. A method of joining at least four heat transfer plates (2) to a plate package (3) for a plate heat exchanger (1), wherein each heat transfer plate (2) comprises an outer edge portion (10) extending around the heat transfer plate (2) in its edge area and an inner edge portion (11) extending around the heat transfer plate (2) inside the outer edge portion (10), and wherein the method includes the steps of: joining the heat transfer plates (2) in pairs at a first contact plane (17) to at least two plate pairs (16) along said inner edge portions (11), bringing an outer edge portion (10) of one of said plate pairs (16) to abutment at a second contact plane (20) to an outer edge portion (10) of another of said plate pairs (16), and welding said two outer edge portions (10) to each other by means of a weld joint (21), wherein said weld joint (21) is produced by means of a high energy beam directed towards one of said two outer edge portions (01) at a distance from the outer edge (9) thereof and at an angle (a) other than perpendicular with respect to said contact plane (20).

2. A method according to claim 1, wherein the high energy beam is directed by means of a member (23, 25) and at least one of the member and the heat transfer plates is moved in relation to each other in such a manner that the member is guided along the outer edge portion (10) beside the heat transfer plates (2).

3. A method according to claim 1 essentially each heat transfer plate (2) is provided with four port-holes (12', 12", 13', 13"), wherein two of the port-holes (12', 12") are surrounded by first port portions (14', 14") and the two other port-holes (13', 13") are surrounded by second port portions (15', 15"), and the heat transfer plates (2) in said plate pairs (16) are joined along the first port portions (14', 14") before the plate pairs (16) are welded to each other.

4. A method according to claim 3, wherein said plate pairs (16) are welded to each other along the second port portions (15', 15") by means of a high energy beam directed towards one of said second port portions (15', 15") at an angle (β) other than perpendicular with respect to said contact plane (20).

5. A method according to claim 4, wherein said high energy beam is directed by means of a member (23, 25) guided around the second port portion.

6. A method according to claim 3 wherein the first port portions (14', 14") of the heat transfer plates (2) in said plate pairs (16) are brought to abutment to each other at the first contact plane (17) before said joining of the plate pairs (16), and that the second port portions (15', 15") of adjacent plate pairs (16) are brought to abutment to each other at the second contact plane (20).

7. A method according to claim 1 wherein at least four plate pairs (16) are stacked onto each other to a plate package (3) and welded to each other in an order which differs from the order in which the plate pairs (16) are stacked in the plate package (3).

8. A method according to claim 4 wherein said high energy beam is a laser beam.

9. A plate package of joined heat transfer plates (2) for a plate heat exchanger (1), in which each heat transfer plate (2) comprises an outer edge portion (10) extending around the heat transfer plate (2) in its edge area and an inner edge portion (11) extending around the heat transfer plate (2) inside the outer edge portion (10), wherein the heat transfer plates (2) are joined in pairs to at least two plate pairs (16) along said inner edge portions (11) at a first contact plane (17) and wherein one of said plate pairs (16) is welded at a second contact plane to an adjacent one of said plate pairs (16) along said outer edge portion (10) by means of a weld joint (21), wherein said weld joint (21) is produced by means of a high energy beam and has, seen in a cross-section through said outer edge portions (10), a centre line (c) which forms an oblique angle ($\alpha$) to the other contact plane (20).

10. A plate package according to claim 9, wherein essentially each heat transfer plate (2) is provided with four port-holes (12', 12", 13', 13"), wherein two of the port-holes (12', 12") are surrounded by first port portions (14', 14") and the two other port-holes (13', 13") are surrounded by second port portions (15', 15"), and the first port portions (14', 14") of said heat transfer plates (2) in said plate pairs (16) are joined to each other.

11. A plate package according to claim 10, wherein adjacent second port portions (15', 15") of two of said plate pairs (16) are welded to each other by means of a second weld joint (22) which is produced by means of a high energy beam.

12. A plate package according to claim 11, wherein the second weld beam (22) seen in a cross-section through said second port portions (15', 15") has a centre line (C) which forms an angle ($\beta$) other than perpendicular to said contact plane (20).

13. A plate package according to claim 12, wherein said angle ($\beta$) is between 50° and 70°.

14. A plate package according to claim 13, wherein said angle ($\beta$) is about 60°.

15. A plate package according to claim 9, wherein said angle ($\alpha$) is between 50° and 70°.

16. A plate package according to claim 15, wherein said angle ($\alpha$) is about 60°.

* * * * *

UNITED STATES PATENT AND TRADEMARK OFFICE
CERTIFICATE OF CORRECTION

PATENT NO. : 6,397,940 B1
DATED : June 4, 2002
INVENTOR(S) : Ralf Blomgren

It is certified that error appears in the above-identified patent and that said Letters Patent is hereby corrected as shown below:

Column 5,
Line 28, change "a" to -- α --.

Column 6,
Line 23, change "a" to -- α --.
Line 31, insert -- , wherein -- after "claim 1".
Line 52, delete "that".

Signed and Sealed this

Twenty-second Day of October, 2002

*Attest:*

*Attesting Officer*

JAMES E. ROGAN
*Director of the United States Patent and Trademark Office*